(12) United States Patent
Perlman et al.

(10) Patent No.: US 12,022,003 B2
(45) Date of Patent: Jun. 25, 2024

(54) SAFE USE OF LEGACY DIGITAL SIGNATURES IN A POST-QUANTUM WORLD

(71) Applicant: Dell Products L.P., Round Rock, TX (US)

(72) Inventors: Radia J. Perlman, Redmond, WA (US); Charles W. Kaufman, Redmond, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 287 days.

(21) Appl. No.: 17/645,816

(22) Filed: Dec. 23, 2021

(65) Prior Publication Data

US 2023/0208649 A1 Jun. 29, 2023

(51) Int. Cl.
*H04L 9/32* (2006.01)
(52) U.S. Cl.
CPC .......... *H04L 9/3247* (2013.01); *H04L 9/3236* (2013.01); *H04L 9/3263* (2013.01); *H04L 2209/56* (2013.01)

(58) Field of Classification Search
CPC ... H04L 9/3218; H04L 9/3236; H04L 9/3247; H04L 9/3263; H04L 9/50; H04L 2209/56
See application file for complete search history.

(56) References Cited

U.S. PATENT DOCUMENTS

| 2022/0123949 A1* | 4/2022 | Ghosh | H04L 9/085 |
| 2023/0291572 A1* | 9/2023 | Griffin | H04L 63/123 |
| | | | 713/176 |

\* cited by examiner

*Primary Examiner* — Minh Dinh
(74) *Attorney, Agent, or Firm* — Workman Nydegger

(57) ABSTRACT

One example method includes sending, by a sender, a commitment message, wherein the commitment message is digitally signed by the sender but is not verifiable by a recipient until a public key is revealed by the sender, transmitting, by the sender, the commitment message to the recipient, confirming, by the sender, that the commitment message has been received by the recipient, and only after receipt of the commitment message has been confirmed by the recipient, revealing in a second message, by the sender, the public key, wherein the public key is usable by the recipient to verify that the commitment message was validly signed by the sender.

20 Claims, 3 Drawing Sheets

SAFE USE OF LEGACY DIGITAL SIGNATURES IN A POST-QUANTUM WORLD

FIELD OF THE INVENTION

Embodiments of the present invention generally relate to the use of digital cryptographic signatures. More particularly, at least some embodiments of the invention relate to systems, hardware, software, computer-readable media, and methods for use of legacy digital cryptographic signatures in environments where the power of quantum computing may be brought to bear by bad actors seeking to access private keys.

BACKGROUND

A large quantum computer may exist, now or in the future, that can break currently deployed legacy public key algorithms. At present, it is unknown when or if such a computer might exist. Meanwhile, although there are potential replacement algorithms that eventually will be standardized, there are a variety of disincentives to switch from a legacy public key algorithm to one of the replacement algorithms.

One is that the new algorithms are more costly, in various respects, than the legacy algorithms, and therefore it would be desirable, if it could be done safely in certain cases, to continue to use legacy algorithms at least for a period of time. Another possible disincentive for switching from a legacy public key algorithm to a new public key algorithm is that a user might own cryptocurrency, and may wait many years before attempting to spend the cryptocurrency, such that there is no pressing need to switch algorithms. As a final example, an enterprise or other entity may have a legacy public key certified, and may not want to bother with the overhead of getting a new algorithm public key, possibly because of a belief that development of quantum computers capable of breaking legacy public keys was years away.

As suggested by the foregoing points, there are a variety of problems with current systems and methods that employ, or rely on, public key algorithms. For example, a large quantum computer, if built, could threaten the security of currently deployed, or 'legacy,' public key algorithms. That is, because the same public key algorithm may operate to generate a pair of keys, that is, the public key and a private key, a sufficiently powerful computer, such as a quantum computer, may be able to access the public key and then use the public key to determine or derive the private key, thereby enabling the quantum computer to decrypt, using the private key, anything that was encrypted with the public key.

Another problem concerns so-called 'quantum safe' replacement public key algorithms. While such algorithms are, or may be, available, they may be less computationally efficient in their operation than legacy public key algorithms.

Still another problem known to exist is that a digitally signed message cannot instantly be sent to a recipient system. Instead, there might be an intermediary that can maliciously delay the message, in order to give itself time to break the public key with which the message has been signed.

Finally, there are cases in which it is likely that current public keys will not be converted to quantum-safe public keys. For example, users might store cryptocurrency coins for years before attempting to spend them. Another disincentive to covert current public keys to quantum-safe public keys is that getting a certificate is expensive, and a party may not want to get a new certificate for a new key. Finally, current legacy public keys may not be converted to quantum-safe public keys simply because there is no sense of urgency to convert, though the world may be taken by surprise by a quantum computer appearing before the world has taken precautions with respect to legacy public keys.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
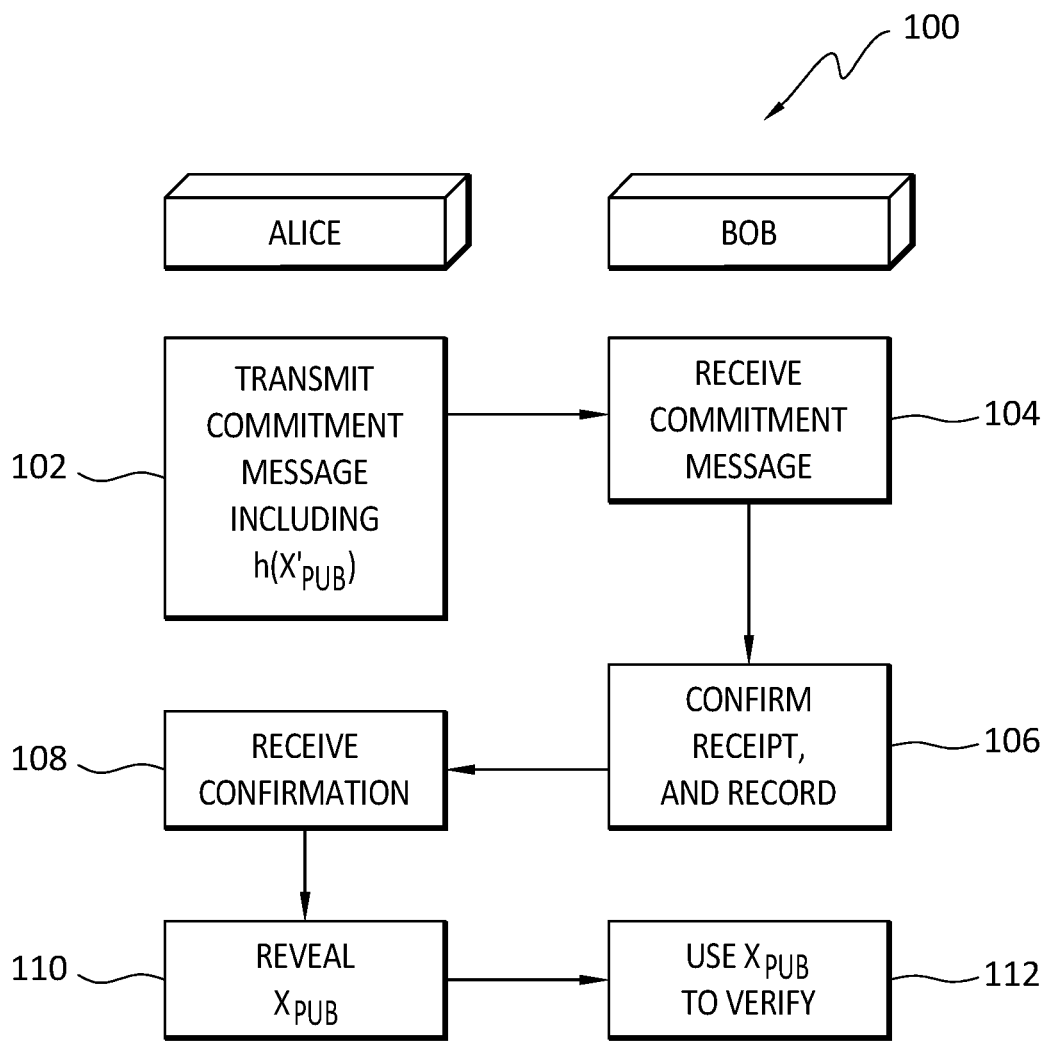
FIG. 1 discloses aspects of an example method for use of a legacy public key in a transaction.

Embodiments of the present invention generally relate to the use of digital signatures. More particularly, at least some embodiments of the invention relate to systems, hardware, software, computer-readable media, and methods for use of legacy digital signatures in environments where the power of quantum computing may be brought to bear by bad actors seeking to access private keys.

As used herein, a digital cryptographic signature, sometimes referred to as a digital signature, refers to an approach for verifying authenticity of data, such as digital messages or documents. Digital signatures are generally used in association with cryptographic protocols for confirming authenticity and integrity of transmitted data.

In one example embodiment, a party, Alice, may transmit a digitally signed commitment message, which may or may not be associated with a blockchain transaction, to an end recipient, such as a service. The commitment message may include a hash of the public key held by Alice, but does not include the public key itself. After Alice has been assured by the service that the service has received has received, and possibly recorded, her commitment message, Alice may then reveal her public key to the service. Once the service and other nodes see the public key that Alice has revealed, they can verify that the signature on the commitment message belongs to Alice. Because the commitment message has already been recorded prior to the revelation of the public key belonging to Alice, a transaction associated with that message cannot be tampered with by any bad actors. Moreover, for further messages, Alice may simply generate new public keys, and corresponding private keys, so access to the public key that was revealed will be of no use to a party attempting to derive the corresponding private key held by Alice. Further aspects of this, and other, embodiments are set forth in the discussion below.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that legacy public keys may continue to be used even where a bad actor may have access to the power of a quantum computer. As another example, while embodiments may use multiple public keys, and a user holding those keys can sign multiple items, only a single certificate from a Certification Authority (CA) is required. Further, embodiments may avoid the need, and associated expense, to convert legacy public keys to quantum-safe keys. Various other advantageous aspects of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Abstract

In this disclosure, reference is made to the currently deployed public key algorithms as "legacy" public key algorithms. The security of legacy public key algorithms depends on it being difficult to factor numbers (e.g., in association with the RSA (Rivest-Shamir-Adleman) public key cryptosystem), or find discrete logarithms (e.g., ECC (elliptic-curve cryptography), El Gamal). Using Shor's algorithm, a sufficiently large quantum computer could solve factoring and discrete logs efficiently, making legacy public key algorithms insecure, if sufficiently large quantum computers existed. This disclosure may also refer to the replacement algorithms as QS algorithms, or "quantum safe" algorithms, to indicate that such algorithms are not susceptible to being broken by a quantum computer.

To summarize, if all of the following were true:
an attacker had use of a sufficiently large quantum computer, and
a victim was using legacy public key technology, and
if the victim's legacy public key were known to that attacker, the attacker could derive the private key of the victim, and also impersonate the victim, such as by forging digital signatures of the victim.

One defense to this problem would be for everyone to convert to one of the to-be-standardized-soon QS public key algorithms, before a quantum computer might exist. However, currently known new algorithms have larger signatures, key sizes, or computational requirements, so in cases where embodiments of the invention would fit the application, it would be desirable to use such embodiments, which are quantum safe, instead of converting to the new algorithms.

In general, example embodiments may operate to prevent an attacker from learning the public key of a target or victim until knowledge of the public key will learned too late to do the attacker any good. The mechanisms employed in example embodiments can be phased in easily, since they do not depend on the creation or use of new public key algorithms. Moreover, implementation of the disclosed approach may be optional, at least in the sense that nodes that start using legacy public keys as disclosed herein may coexist with existing nodes. Existing nodes will remain safe for years, since a quantum computer capable of threatening legacy public key algorithms is many years away, and perhaps will never be built.

Embodiments within the scope of this disclosure may be quantum safe without using the new algorithms, meaning that legacy digital cryptographic signature algorithms can be used safely forever, even if large quantum computers were available to attackers. And since the design described in this disclosure is more efficient in its operation than the new algorithms, at least some example embodiments could be attractive long-term solutions in cases where the disclosed approach fits the application. In applications where the disclosed approach fits well, that approach would be easier to convert to in the short term, and more efficient in the long term.

B. Overview

The following discussion provides some context and details for some example embodiments of the invention. As well, an introduction is provided concerning some example embodiments. This discussion is not intended to limit the scope of the invention in any way.

B.1 Context

In more detail, the present disclosure specifies a way of implementing digital signatures with legacy algorithms that will be safe even if a nation state or some other well-funded entity had access to a large quantum computer. Example embodiments may not require new algorithms and, as such, these embodiments may be relatively easy for an enterprise or other entity to quickly deploy. Moreover, methods and processes according to at least some of the disclosed embodiments may be deployed in such a way that systems implementing those methods and processes may easily coexist with systems that do not. Consequently, embodiments of the invention may be phased in immediately by an entity, but deployed by the entity as gradually as needed and circumstances permit.

There may be certain assumptions and pre-conditions that apply to at least some example embodiments. One such assumption is that the security of current hash algorithms is not threatened by quantum computers. That is, for example, a quantum computer would not be able to derive a public key from a hash of that public key. Another such assumption is that a party, who may be referred to herein as 'Alice,' cannot instantaneously inject a message into the system. Instead, Alice must forward her message to some intermediate node N that will eventually get the message to the end recipient system where that message will be recorded.

This intermediate node might be a router on the path to a server providing some service, or in the case of a blockchain network, one of the blockchain nodes that are supposed to forward the message from Alice to the network of blockchain nodes, so that whichever miner creates the next block can include the transaction in the new block. If the intermediate node N that forwards the message from Alice were malicious, that node could delay forwarding of the message. During the delay, N could, if it had access to a large quantum computer, calculate the private key that belongs to Alice and which corresponds to the public key. Then malicious N could forge a digital signature from Alice on some message, and inject the fraudulently signed message instead of the signed message from Alice, so that the system for which the message from Alice was originally intended would not be able to recognize which of the messages were fraudulent, that is, the message from Alice or the message inserted by N.

Embodiments of the invention may provide a defense against such actions by a malicious node, notwithstanding an assumption that the public key belonging to Alice may have been generated by legacy public key algorithms, and a further assumption that attackers controlling a malicious node have access to large quantum computers that can quickly calculate private keys from public keys.

B.2 Introduction

By way of brief introduction to aspects of some example embodiments, and in light of the foregoing overview, in embodiments of the invention, the public key belonging to Alice may not be divulged by Alice until necessary, which is when verifiers, such as an entity to which Alice has directed a commitment message for example, need to be able to verify her signature on a message.

To avoid divulging her public key, a certificate issued by a CA will certify "The hash of Alice's public key is h(X)," rather than "Alice's actual public key is X." Or in the example case of cryptocurrency, Alice will tell Bob to pay an amount to h(X) rather than X. That is, Alice will tell Bob to pay the amount to the party or entity from which Bob received h(X). In this way, and with reference to the aforementioned examples, Alice need not reveal her public key X until after the intended recipient of her message has received and recorded her message, or until she is ready to spend the cryptocurrency that Bob paid her. Note that as used herein, 'h' refers to a hash function. The scope of the invention is not limited to the use of any particular hash function.

When Alice wants to sign a message M, she can inject a "commitment message" into the system. The commitment message will require Alice to prove knowledge of her private key, but will not be verifiable by another until her public key X is revealed, which Alice will only do after Alice can verify that the commitment message has been received by the system or other intended recipient. In at least some embodiments, the commitment message may include the entire signed M, but will not divulge X. After Alice is assured that the commitment message has been received by the system, such as by a return message to her from the system, she can then reveal X, which means that the commitment message can then be validated, by the system or recipient, as having been transmitted by Alice.

Once Alice reveals her public key X, a malicious node could use her public key to derive her corresponding private key and start forging her signature. However, embodiments of the invention may implement a rule such that once the public key X is known, the message matching the earliest commitment message based on the public key X is valid, and all other messages signed by X are not valid. So because Alice made sure that the commitment message was acknowledged by the system before she revealed her public key, it would do no good for anyone to forge her signature, since any message that might be sent by a bad actor who had derived her private key would be later in time than the commitment message that Alice initially sent.

As will be apparent, once Alice has divulged her public key X, it is not safe for her to use it for any additional signatures. Thus, if Alice needs to sign more than one item, she may create a new public key X', and a corresponding private key, and she may include the hash of the new public key X' in a field of the commitment message. Alice may then sign the commitment message with her as-yet-unrevealed public key X. In this way, the hash of X' is signed with the public key X. Because Alice signs the hash of X' with her public key X, which will not be revealed until after the commitment message, including the hash of X', is recorded, a bad actor gaining access to the public key X after the commitment message has been recorded will not be able to use the public key X to announce a valid new public key X', since only a hash of X', that has been signed with the public key X, will be considered valid, and any message signed with X after the commitment message has been recorded will not be considered valid. Finally, because typical public key algorithms are relatively fast and easy to operate, Alice is able to easily generate new key pairs as she needs them.

In the example use case of cryptocurrency, Alice must provide h(X'), signed with her public key X, to any entity that will be paying her money using h(X'). As another example, if Alice wishes to pay another entity in a transaction that will be signed by X', Alice must provide h(X'), signed with her public key X, to that entity. As it is common for cryptocurrency users to create many public keys, this approach is not problematic. Note that it is also easy for multiple entities to pay cryptocurrency to the original h(X). It is only when Alice needs to spend the cryptocurrency that she will need to reveal her public key X so that her signature on the transaction in which she spends the cryptocurrency can be verified by the other party to the transaction. As noted earlier, once Alice has revealed X, she has to stop using X, but she can generate a new public key X' if necessary for another message or transaction.

Thus, for applications other than cryptocurrency, embodiments of the invention may provide that where a CA certifies a public key that belongs to Alice, the CA will certify h(X) instead of X. Further, Alice only needs a single certificate from a CA, even though she will only sign a single thing with X, e.g., h(X). Alice can still sign an arbitrary number of messages safely, because each signature reveals a hash of the next public key that Alice has created.

C. Further Aspects of Some Example Embodiments

To further illustrate aspects of some example embodiments, attention is directed to an example involving the use of cryptocurrency with blockchains. In this illustrative, and non-limiting, example Alice has a legacy key pair ($X_{pub}$, $X_{priv}$) that includes a public key and corresponding private key generated by a legacy key algorithm. If Bob is to pay Alice cryptocurrency, Alice tells Bob to sign the currency over to $h(X_{pub})$. Note that Alice does not divulge $X_{pub}$ to anyone until she needs to spend the currency she has received from Bob. However, given that Bob will make his payment to $h(X_{pub})$, and given that it is assumed that hashes generated by a hash function 'h' are not threatened by quantum computers, knowledge of $h(X_{pub})$ will not make Alice vulnerable.

In other words, even if an attacker saw $h(X_{pub})$, the attacker would still have to find a preimage of $h(X_{pub})$, that is, a quantity whose hash=$h(X_{pub})$, in order to try to obtain $X_{pub}$. However, it is not presently feasible for classical computers or quantum computers to do this. Also, not only would the quantity found by the attacker need to have a hash equal to $h(X_{pub})$, but that quantity would also have to be a valid public key. Then the attacker would need to break that public key to obtain the corresponding private key. Since nobody knows $X_{pub}$ until it is revealed by Alice, they only know $h(X_{pub})$, nobody can verify her signature.

If Alice needs to digitally sign something, she will eventually have to reveal $X_{pub}$ so that others will be able to verify her digital signature. But once she reveals her actual public key $X_{pub}$, someone with a quantum computer could calculate her private key from that public key. Thus, example embodiments are configured, and operate, such that once Alice reveals $X_{pub}$, it will be too late for an attacker to use knowledge of her private key to impersonate Alice.

With reference again to the cryptocurrency example, if Alice is to receive cryptocurrency from Bob, she tells Bob to pay to $h(X_{pub})$. When Alice wants to spend the cryptocurrency she received from Bob, she will need to reveal her actual public key so that her digital signature on the transaction for which she spends the cryptocurrency can be verified.

Thus, in example embodiments of the invention, Alice first transmits what is referred to herein as a "commitment message" that can only be generated by someone with knowledge of her private key, but cannot be verified until Alice reveals her public key. For this example, it may be assumed that the commitment message contains everything that would be in a transaction message, but without revealing the public key that belongs to Alice. In general, an example process flow according to some embodiments may proceed as follows:

1. Alice will transmit a commitment message, which may contain:
   a. $h(X_{pub})$ will pay a specific amount to recipient $h(Y)$. (e.g., a hash of Alice's public key will pay to the hash of the recipient's public key); and
   b. A digital signature on the commitment message.
2. After Alice has gotten assurance from the service that it has received her commitment message, which in the case of blockchain means that Alice verifies that her commitment message is safely and immutably recorded in the blockchain, she can then reveal $X_{pub}$.
3. Once other nodes see $X_{pub}$ from Alice, those nodes can verify her digital signature on the commitment message, and those nodes may also verify the transaction, when it is included in the commitment message.

If an attacker were to derive or calculate the private key at this point, that is, after Alice has revealed her public key, it would not do the attacker any good, because the commitment message that Alice sent is already recorded in the system and is now verifiable as valid. So even though the attacker could at this point forge her signature, the approach implemented by example embodiments is that once Alice has revealed her public key, it is the earliest valid commitment message received by the system that is the only valid message from Alice. If an attacker attempted to inject a fraudulent commitment message from $h(X_{pub})$, earlier than the commitment message that Alice sent, and assuming that hashes are secure, the attacker would not have been able to forge her signature on the commitment message until it knew $X_{pub}$, but Alice will not reveal $X_{pub}$ until after her signed commitment message has been confirmed as safely received by the system to which that message was directed by Alice.

Note that once Alice reveals $h(X_{pub})$, example embodiments prevent her from digitally signing anything further with X, since attackers, who may possess quantum computers, at this point can forge her digital signature. If Alice needs to digitally sign more than one item, Alice can add an extra field to the commitment message. That extra field will include the hash of the next public key that Alice will use, that is, $h(X'_{pub})$.

Thus, an example commitment message may include the elements: (1) $h(X_{pub})$ will pay a specific amount to recipient $h(Y)$; (2) the hash of my next public key is $h(X'_{pub})$; and, (3) a signature on the commitment message. Alternatively, Alice could instead reveal $h(X'_{pub})$ in the message where she reveals $X_{pub}$, in which case that message may contain the elements: (1) my actual public key is $X_{pub}$; (2) the hash of my next public key is $h(X'_{pub})$; and, (3) a digital signature on this message (which is required if $h(X'_{pub})$ is revealed here instead of in the commitment message). Note that in either of these alternatives, Alice does not reveal $X'_{pub}$, and reveals only $h(X'_{pub})$, at least until there is a need for her to reveal $X'_{pub}$.

It is noted with respect to the cryptocurrency use case, Alice does not have to reveal a "next" public key, since she can just tell future payers to use different pay-to addresses. For other example uses, such as a bank that requires Alice to digitally sign certain commands, it would be useful to set up a next public key once Alice reveals the current one. To remain compatible with current nodes, that may make their public key publicly available in their certificate, or their pay-to value, and who do not issue commitment messages, the rule would be that if no commitment message is received first, a validly signed message would be accepted. Also, nodes that use their actual public key instead of a hash of their public key could continue to do so.

D. Further Discussion

As will be apparent from this disclosure, example embodiments of the invention may provide various advantages and features. For example, embodiments may help to defeat attackers by providing that a public key of the sender of a message will not be revealed until that message, which may be a commitment message, has been confirmed as safely received, and recorded if applicable, by the service. As another example, embodiments may provide that a commitment message will be digitally signed, but will not be verifiable until the actual public key is revealed. Further, embodiments may operate to reveal a hash of the next public key in a message signed by the current public key, so that only a single certificate from a CA is needed, while still allowing the signer to sign multiple items. As a final example, embodiments of the invention may provide a quantum safe alternative to the use of quantum safe algorithms. As used herein, a 'sender' includes a computing entity that operable to perform one or more operations in response to commands and other input received by the computing entity from a human.

E. Example Methods

It is noted with respect to the example method of FIG. 1 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 1, a method 100 is disclosed that may be performed by 'Alice' and a system, which may be a computing system. 'Alice' may be, or comprise, any computing system that comprises hardware and/or software and which is responsive to instructions from a human, which may be transmitted by way of a UI (User Interface), such as a graphical user interface or a command line interface. Similarly, the computing system may comprise hardware and/or software and may be responsive to instructions from a human, which may likewise be transmitted by way of a UI. In some embodiments, 'Alice' and/or the system may comprise respective servers, but no particular type of computing system, hardware, or software, is required for either.

The example method 100 may begin when Alice transmits 102 a commitment message to the system. The commitment message, which may be digitally signed with the public key $X_{pub}$, may include a field that holds the hash of a subsequent public key X' generated by Alice, that is, h(X'). In this way, h(X') may be digitally signed using $X_{pub}$, and then revealed at 102 by virtue of its inclusion in the transmitted commitment message. Note that $X'_{pub}$ itself is not revealed at 102, only h($X'_{pub}$) is revealed. Further, the system reveals h($X'_{pub}$) before the current public key $X_{pub}$ is eventually revealed 112. At 104, the system may receive the commitment message from Alice. Next, the system may respond to the communication 102 from Alice by transmitting a confirmation 106 to Alice that the commitment message has been received, and recorded where applicable, by the system. Alice may receive 108 the confirmation transmitted 106 by the system.

After, and only after, Alice has received 108 the confirmation from the system, Alice may then reveal 112 the public key $X_{pub}$. As a result, not only the system, but also any other entity or party, can access that public key $X_{pub}$. After the public key $X_{pub}$ has been revealed 112 by Alice, the system may then use that public key to verify 114 that the commitment message purported to be sent 102 by Alice is, in fact, valid.

Note that after Alice has revealed 112 the public key $X_{pub}$, it can no longer be used for future communications or transactions, since it may be used by an attacker to derive the corresponding private key. Thus, and as noted above, the system reveals h($X'_{pub}$) 110 before revealing $X_{pub}$ 112 since once $X_{pub}$ has been revealed 112, a malicious entity that has computed the private key corresponding to $X_{pub}$ could then sign a commitment message or other message asserting what the next hash of a public key will be. Once Alice has revealed h($X'_{pub}$), she can then use $X'_{pub}$ for a subsequent transaction or message. As noted earlier, the commitment message may be signed by Alice using $X_{pub}$, but the commitment message will remain unverifiable until Alice reveals $X_{pub}$ 110.

Figure 2:
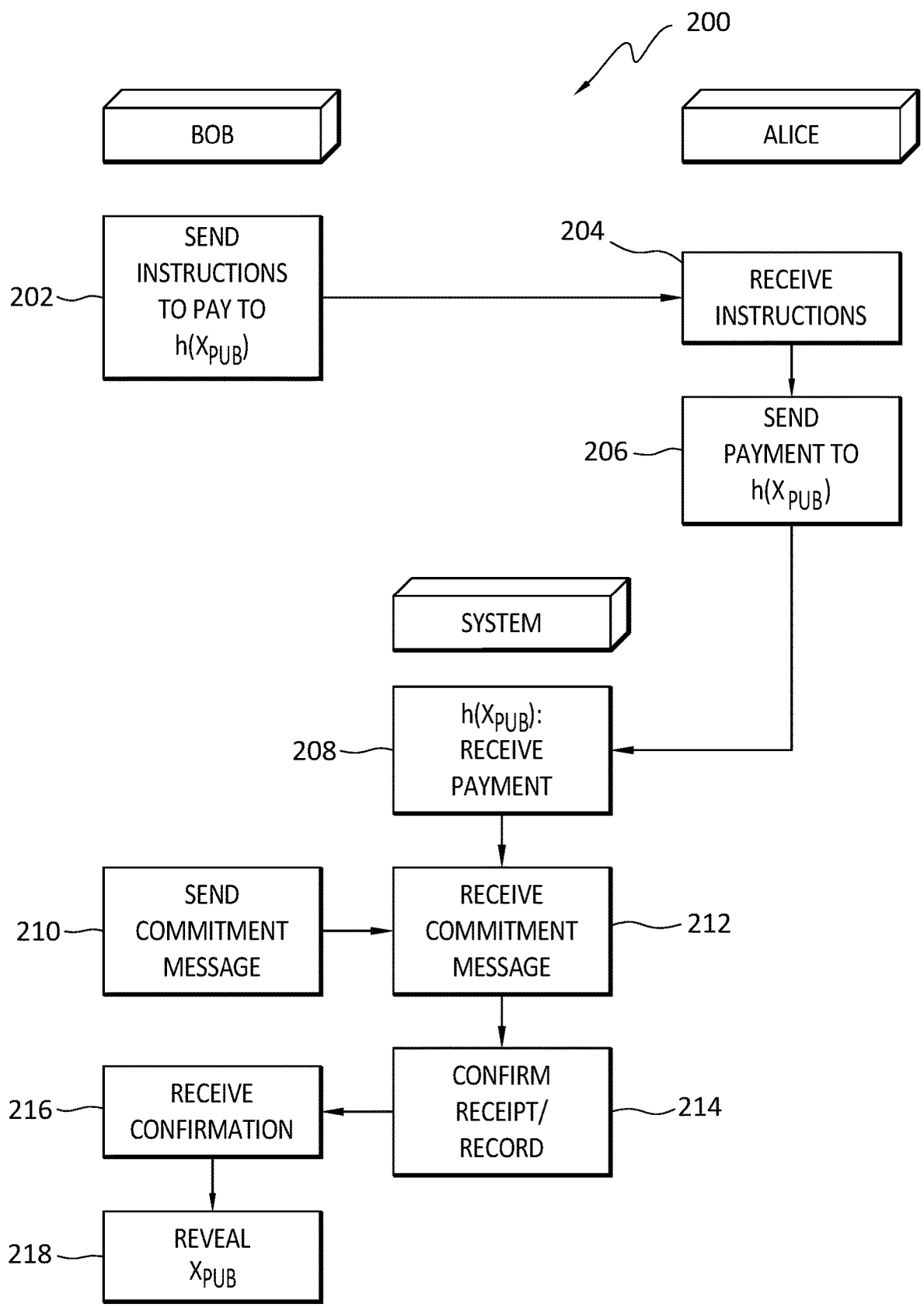
FIG. 2 discloses aspects of an example method for use of a legacy public key in a blockchain transaction.

Turning next to FIG. 2, an example method 200 is disclosed that is performed by and between 'Alice' and 'Bob' where, as noted in connection with the discussion of FIG. 1, Alice, and Bob in the present case, may be, or comprise, any computing system that comprises hardware and/or software and which is responsive to instructions from a human, which may be transmitted by way of a UI (User Interface) such as a graphical user interface or a command line interface. The example method 200 may be performed, for example, in connection with a blockchain transaction, such as a cryptocurrency based transaction for example.

Initially, Alice and Bob may agree to enter into a transaction in which Bob will provide something of value to Alice in exchange for a payment, by Alice, of cryptocurrency or other exchange medium to Bob. Thus, Bob may send instructions 202, to Alice, indicating that Alice should make her payment to h($X_{pub}$). Note that Bob does not reveal $X_{pub}$ at this juncture since, to do so, would enable a bad actor to derive the corresponding private key held by Bob. Rather, and as described below, Bob will only reveal $X_{pub}$ after he has taken steps to ensure that he can prove he knows the private key.

After she receives 204 the instructions from Bob, Alice may then make her payment 206 to h($X_{pub}$). At some point after Alice has paid 206 Bob, Bob may decide to spend the cryptocurrency that he received from Alice. In order to do so however, Bob must prove, at least to the party to whom he proposes to make payment, that he knows the private key to which $X_{pub}$ corresponds. Thus, Bob may send 210 a commitment message, which Bob has validly signed using his private key, to a system and, after the system has received 212 the commitment message, the system may then confirm receipt 214 of the message and may also record the message, for example onto an immutable digital ledger such as a blockchain. After Bob has received 216 the confirmation from the system, Bob can then reveal $X_{pub}$ 218, enabling the other party to his transaction to verify his identity. Although other malicious entities could now, after revelation of the public key $X_{pub}$, derive the corresponding private key using $X_{pub}$, the commitment message that Bob sent 210 was validly signed, and was the first recorded, that is, by the system, message using the private key held by Bob. Thus, even if the private key were thus derived maliciously, the message that Bob sent was the first to use the private key, and any other message sent thereafter, using that private key, would not be valid.

Thus, the example method 200 may enable Bob to prove to another party that he holds the private key to which a revealed public key corresponds. As well, the method 200 may enable Bob to prevent, by virtue of the fact that Bob sent the first valid commitment message with his private key, any other malicious party from sending a valid message using that private key.

F. Further Example Embodiments

Following are some further example embodiments of the invention. These are presented only by way of example and are not intended to limit the scope of the invention in any way.

Embodiment 1. A method, comprising: sending, by a sender, a commitment message, wherein the commitment message is digitally signed by the sender but is not verifiable by a recipient until a public key is revealed by the sender;

transmitting, by the sender, the commitment message to the recipient; confirming, by the sender, that the commitment message has been received by the recipient; and only after receipt of the commitment message has been confirmed by the recipient, revealing in a second message, by the sender, the public key, wherein the public key is usable by the recipient to verify that the commitment message was validly signed by the sender.

Embodiment 2. The method as recited in embodiment 1, wherein the sender holds a certificate that certifies that that the hash of the public key is h(Xpub).

Embodiment 3. The method as recited in embodiment 2, wherein the sender retains the same certificate even when one or more new public keys are generated and used by the sender.

Embodiment 4. The method as recited in any of embodiments 1-3, wherein when the commitment message is the earliest, validly signed, commitment message received by the recipient, any other commitment message subsequently received by the recipient is deemed to be invalid.

Embodiment 5. The method as recited in any of embodiments 1-4, wherein the commitment message includes a hash of a new public key.

Embodiment 6. The method as recited in any of embodiments 1-5, wherein prior to revealing the public key, the sender reveals a hash of the public key.

Embodiment 7. The method as recited in any of embodiments 1-6, wherein the sender is a party to a prospective cryptocurrency transaction and the sender is only able to complete the cryptocurrency transaction after the recipient has verified that the commitment message was validly signed by the sender.

Embodiment 8. The method as recited in embodiment 7, further comprising sending by the sender, prior to the sending of the commitment message, instructions to another party to the prospective cryptocurrency transaction, and the instructions include a hash of the public key to which the another party is instructed to make payment.

Embodiment 9. The embodiment as recited in any of embodiments 1-8, wherein the public key and the private key are generated by a legacy public key algorithm.

Embodiment 10. The method as recited in any of embodiments 1-9, wherein the commitment message can only be generated by the sender because the sender holds the private key.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
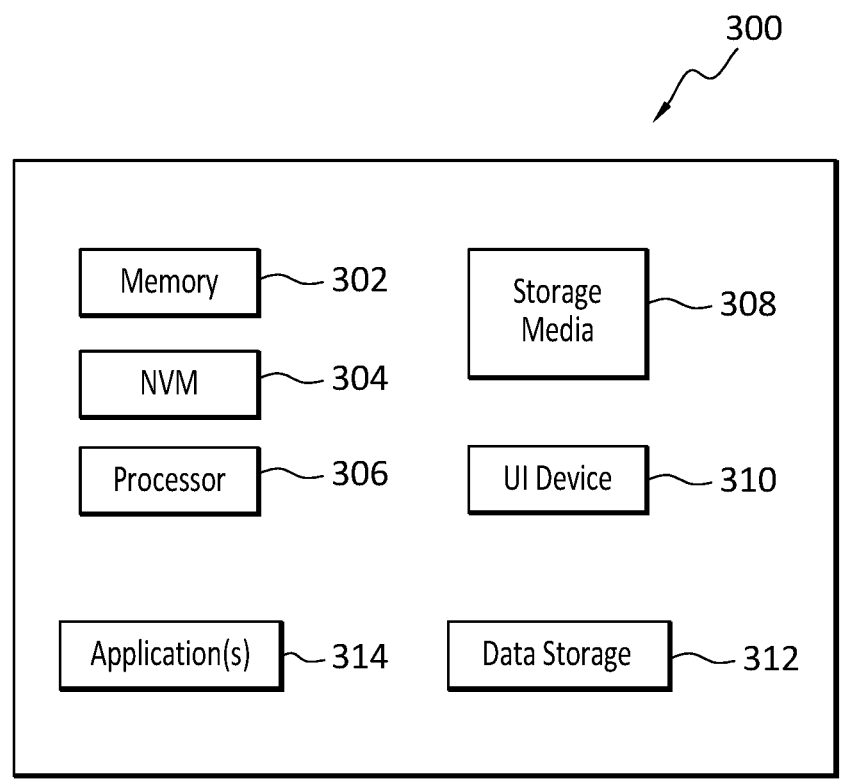
FIG. 3 discloses aspects of an example computing entity operable to perform any of the claimed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   generating, by a sender, a commitment message, wherein the commitment message is digitally signed by the sender but is not verifiable by a recipient until a public key is revealed by the sender;
   transmitting, by the sender, the commitment message to the recipient;
   confirming, by the sender, that the commitment message has been received by the recipient; and
   only after receipt of the commitment message has been confirmed by the recipient, revealing in a second message, by the sender, the public key, wherein the public key is usable by the recipient to verify that the commitment message was validly signed by the sender.

2. The method as recited in claim 1, wherein the sender holds a certificate that certifies that a hash of the public key is h(Xpub).

3. The method as recited in claim 2, wherein the sender retains the same certificate even when one or more new public keys are generated and used by the sender.

4. The method as recited in claim 1, wherein when the commitment message is the earliest, validly signed, commitment message received by the recipient, any other commitment message subsequently received by the recipient is deemed to be invalid.

5. The method as recited in claim 1, wherein the commitment message includes a hash of a new public key.

6. The method as recited in claim 1, wherein prior to revealing the public key, the sender reveals a hash of the public key.

7. The method as recited in claim 1, wherein the sender is a party to a prospective cryptocurrency transaction and the sender is only able to complete the cryptocurrency transaction after the recipient has verified that the commitment message was validly signed by the sender.

8. The method as recited in claim 7, further comprising sending by the sender, prior to the sending of the commitment message, instructions to another party to the prospective cryptocurrency transaction, and the instructions include a hash of the public key to which the another party is instructed to make payment.

9. The method as recited in claim 1, wherein the public key and the private key are generated by a legacy public key algorithm.

10. The method as recited in claim 1, wherein the commitment message can only be generated by the sender because the sender holds the private key.

11. A non-transitory storage medium having stored therein instructions that are executable by one or more hardware processors to perform operations comprising:
    generating, by a sender, a commitment message, wherein the commitment message is digitally signed by the sender but is not verifiable by a recipient until a public key is revealed by the sender;
    transmitting, by the sender, the commitment message to the recipient;
    confirming, by the sender, that the commitment message has been received by the recipient; and
    only after receipt of the commitment message has been confirmed by the recipient, revealing in a second message, by the sender, the public key, wherein the public key is usable by the recipient to verify that the commitment message was validly signed by the sender.

12. The non-transitory storage medium as recited in claim 11, wherein the sender holds a certificate that certifies that that the hash of the public key is h(Xpub).

13. The non-transitory storage medium as recited in claim 12, wherein the sender retains the same certificate even when one or more new public keys are generated and used by the sender.

14. The non-transitory storage medium as recited in claim 11, wherein when the commitment message is the earliest, validly signed, commitment message received by the recipient, any other commitment message subsequently received by the recipient is deemed to be invalid.

15. The non-transitory storage medium as recited in claim 11, wherein the commitment message includes a hash of a new public key.

16. The non-transitory storage medium as recited in claim 11, wherein prior to revealing the public key, the sender reveals a hash of the public key.

17. The non-transitory storage medium as recited in claim 11, wherein the sender is a party to a prospective cryptocurrency transaction and the sender is only able to complete the cryptocurrency transaction after the recipient has verified that the commitment message was validly signed by the sender.

18. The non-transitory storage medium as recited in claim 17, further comprising sending by the sender, prior to the sending of the commitment message, instructions to another party to the prospective cryptocurrency transaction, and the instructions include a hash of the public key to which the another party is instructed to make payment.

19. The non-transitory storage medium as recited in claim 11, wherein the public key and the private key are generated by a legacy public key algorithm.

20. The non-transitory storage medium as recited in claim 11, wherein the commitment message can only be generated by the sender because the sender holds the private key.

* * * * *